UNITED STATES PATENT OFFICE.

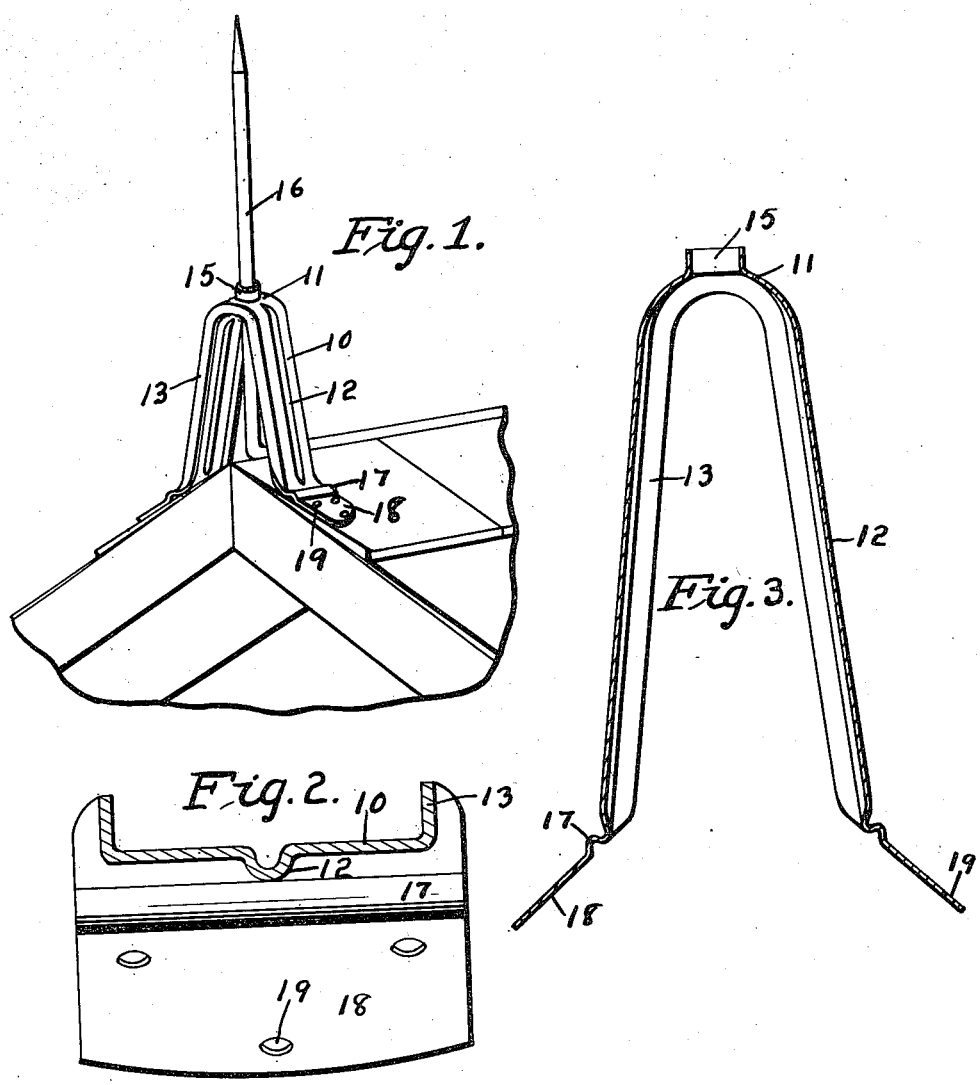

THOMAS W. DODD, OF DES MOINES, IOWA, ASSIGNOR TO DODD & STRUTHERS, OF DES MOINES, IOWA, A CORPORATION.

BRACKET FOR LIGHTNING-ROD POINTS.

1,140,582.  Specification of Letters Patent.  Patented May 25, 1915.

Application filed March 17, 1913. Serial No. 755,025.

*To all whom it may concern:*

Be it known that I, THOMAS W. DODD, a citizen of the United States, residing at Des Moines, in the county of Polk and State of Iowa, have invented a new and useful Bracket for Lightning-Rod Points, of which the following is a specification.

The object of my invention is to provide a bracket for lightning rod points of simple, durable, and inexpensive construction, and more particularly it is my object to produce a bracket of the kind mentioned, made of material such as copper or annealed metal so that the bracket is made from a thin plate, but will be strong, tough, and at the same time may be readily bent into different shapes.

A further object is to provide such a device made of comparatively light material so formed as to be strongly reinforced and to have a bearing for the lightning rod point, said bracket being so formed and constructed that it may be made of a single strip of metal.

My invention consists in certain details, in the construction, combination and arrangement of the various parts of the device whereby the objects contemplated are attained, as hereinafter more fully set forth, pointed out in my claims and illustrated in the accompanying drawings, in which—

Figure 1 shows a perspective view of my improved bracket for lightning rod point installed on roof. Fig. 2 shows a horizontal transverse sectional view through one of the arms of my bracket. Fig. 3 shows a vertical central sectional view through my improved bracket.

It is my purpose to make my bracket from a single piece of comparatively thin metal, which must be of metal that is strong, tough, and yet easily bent and, to so shape and form said strip as to reinforce it to produce maximum strength with minimum weight.

In the accompanying drawings I have used the reference numeral 10 to indicate generally the arms of my improved bracket, which bracket has substantially the shape of an inverted U, as clearly shown in Figs. 1 and 3. The arms are connected at their ends by a curved portion 11. Each arm is formed with a longitudinal outwardly extending bead 12, extending from the curved portion 11 to a point spaced apart from the lower free end of the arm 10. The arms 10 and the curved portion 11 are provided at each edge with an inwardly extending flange 13. Flanges 13 and the beads 12 are designed to reinforce and strengthen the bracket in order to give it great strength although it is originally made from a single flat strip substantially rectangular in shape. In the manufacture of my improved bracket I cut a small hole 13 in the middle of the curved portion 11, and then spin the metal, thereby enlarging the hole and forming an upwardly extending cylindrical portion 15, which forms a long bearing for the lightning rod point 16. The flange 13 extends to the points near the lower ends of the arms 10. Near the lower ends of the flanges 13 and ridges 12, I form in each arm 10 an outwardly extending transverse bead 17, the purpose of which will hereinafter be more fully explained. The lower free ends 18 of the arms 10 are flat and are turned outwardly at acute angles to the planes in which the arms lie, on which said ends are formed. In the flat ends 18 I have cut a plurality of holes 19 to receive screws or nails, whereby said flat ends may be secured to the roof. The bracket is made of material which may be readily bent in order that the ends 18 may be easily turned to different angles with relation to the arms 10. In installing lightning rod points the brackets may be secured to roofs having different pitches or even to flat roofs, and by making my improved brackets from the material mentioned I am able to bend the free ends so that the flat portions 18 may rest firmly against the roof or support on which the bracket is mounted. I have formed the transverse beads 17, so that the portions 18 may be more easily bent closing a straight line for use on any pitch of roof. The advantages of my improved bracket may be seen from the foregoing description.

The device is inexpensive in so much that it is made of a thin strip of metal and few operations are required to make it. The beads and flanges are formed by means of a die and give the thin strip of metal comparatively great strength and rigidity. The cylindrical portion 15, which forms a bearing for the point is formed from the same strip of metal and is of considerable importance, in so much as it provides a broad bearing surface. If no such cylindrical portion were formed and only a hole cut in the curved portion 11, the result would be that the lightning rod point would be sawed as it was vibrated by the wind or the hole would be enlarged and the bracket pulled loose by the vibration of the point. It will be seen that my bracket has ample strength to support lightning rod point against movement toward either arm 10. The flat portions 18 also serve for supporting the point against movement in the transverse direction with relation to the curved portion 11. In this connection it may be noted that my bracket is preferably designed to be used in connection with my cable and tube coupler as disclosed in my application for patent filed May 6, 1912, Ser. No. 695,557, and that when so used the bracket is intended to straddle the cable so that when the cable and tube coupler are secured in position, they will also help to hold the lightning rod point against movement on the transverse line with relation to the curved portion 11.

I claim as my invention—

A lightning rod support comprising a single strip of comparatively thin metal bent into substantially the shape of an inverted U, having downwardly and outwardly extending arms and a curved central portion at the upper ends of said arms, inwardly extending flanges at the edges of said arms and connecting portions, each of the said arms being formed with a central longitudinal outwardly extending bead and with a flat portion at its lower end, extending at an acute angle from the main part of said arm, the said flat portion, and of such material as to be readily bent to different angles, being provided with openings to receive fastening devices, for securing said flat portions to a roof, said central portion being formed with a central opening and an upwardly extending cylindrical portion, adapted to receive a rod and form a bearing and support therefor.

THOS. W. DODD.

Witnesses:
M. WALLACE,
H. ANDERSON.